United States Patent
Mothais et al.

(10) Patent No.: US 11,281,613 B2
(45) Date of Patent: Mar. 22, 2022

(54) JOINT MANAGEMENT BY AN ONBOARD COMPUTER OF A MOTOR VEHICLE OF AN OPERATIONAL FUNCTION AND A GATEWAY FUNCTION BETWEEN DATA COMMUNICATION BUSES

(71) Applicants: Continental Automotive France, Toulouse (FR); Continental Automotive GmbH, Hannover (DE)

(72) Inventors: David Mothais, Toulouse (FR); Thibaud Collé, Toulouse (FR); Vincent Fabre, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 0 days.

(21) Appl. No.: 17/292,775

(22) PCT Filed: Dec. 5, 2019

(86) PCT No.: PCT/EP2019/083785
§ 371 (c)(1),
(2) Date: May 11, 2021

(87) PCT Pub. No.: WO2020/115191
PCT Pub. Date: Jun. 11, 2020

(65) Prior Publication Data
US 2021/0397575 A1 Dec. 23, 2021

(30) Foreign Application Priority Data
Dec. 6, 2018 (FR) ........................................ 1872445

(51) Int. Cl.
*G06F 13/40* (2006.01)
*G07C 5/08* (2006.01)

(52) U.S. Cl.
CPC ....... *G06F 13/4027* (2013.01); *G07C 5/0841* (2013.01)

(58) Field of Classification Search
CPC ...... G06F 13/4027; G06F 13/14; G06F 13/24; G06F 13/36; G06F 13/3625;
(Continued)

(56) References Cited

U.S. PATENT DOCUMENTS 5,511,165 A * 4/1996 Brady ................. G06F 13/4027
709/216
5,555,383 A * 9/1996 Elazar .................. G06F 13/362
710/25

(Continued)

OTHER PUBLICATIONS

International Search Report and Written Opinion for International Application No. PCT/EP2019/083785 dated Jan. 30, 2020, with partial English translation, 8 pages.
(Continued)

*Primary Examiner* — Nimesh G Patel
(74) *Attorney, Agent, or Firm* — RatnerPrestia

(57) ABSTRACT

A method for managing frames in a computer providing an operational function and a gateway function between two communication buses in order to transmit messages from a transmitter to a receiver, including: receiving messages from a transmitter via the first bus; storing the received messages; triggering an interrupt of the execution of an operational program causing the processing of the stored messages for transmission to the receiver via the second bus; deactivating the interrupt in order to continue the execution of the functional program, after the expiration of a duration and at the end of the processing of a message currently being processed during the expiration; and, triggering a new interrupt at the end of a timeout of a duration of the execution of the operational program causing the processing (Continued)

of messages stored for transmission to the receiver via the second bus to continue.

10 Claims, 4 Drawing Sheets

(58) Field of Classification Search
CPC ............... G06F 13/372; G06F 13/4004; G06F 13/4031; G07C 5/0841
See application file for complete search history.

(56) References Cited

U.S. PATENT DOCUMENTS

| | | |
|---|---|---|
| 6,339,808 B1 | 1/2002 | Hewitt et al. |
| 6,442,632 B1 * | 8/2002 | Hayek ................. G06F 13/4031 710/119 |
| 6,654,833 B1 * | 11/2003 | LaBerge ............. G06F 13/3625 710/107 |
| 2002/0161953 A1 * | 10/2002 | Kotlowski .......... G06F 13/4031 710/113 |
| 2006/0106982 A1 * | 5/2006 | Ashmore ............ G06F 11/2089 711/114 |
| 2014/0304440 A1 | 10/2014 | Barr et al. |
| 2015/0089104 A1 | 3/2015 | Ye et al. |

OTHER PUBLICATIONS

International Search Report and Written Opinion for International Application No. PCT/EP2019/083785, dated Jan. 30, 2020, 12 pages (French).

English Translation of the Written Opinion for International Application No. PCT/EP2019/083785, dated Jan. 30, 2020, 5 pages.

* cited by examiner

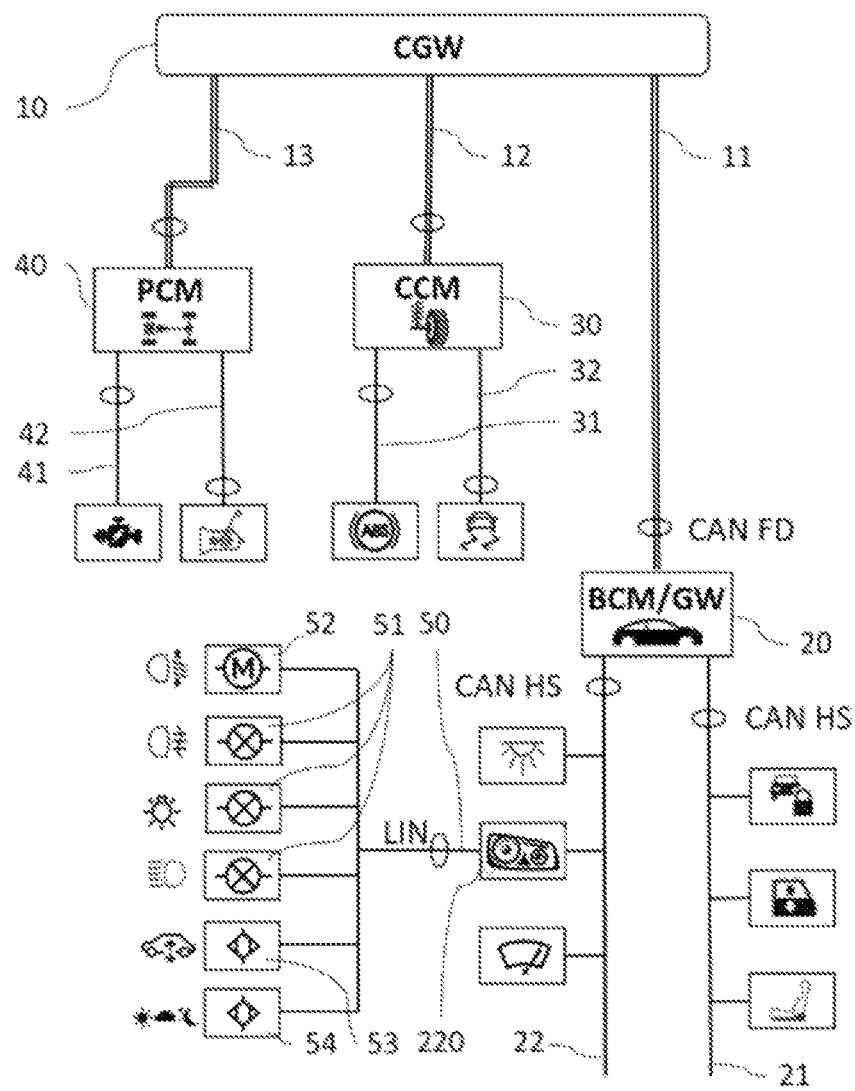
[Fig. 1]

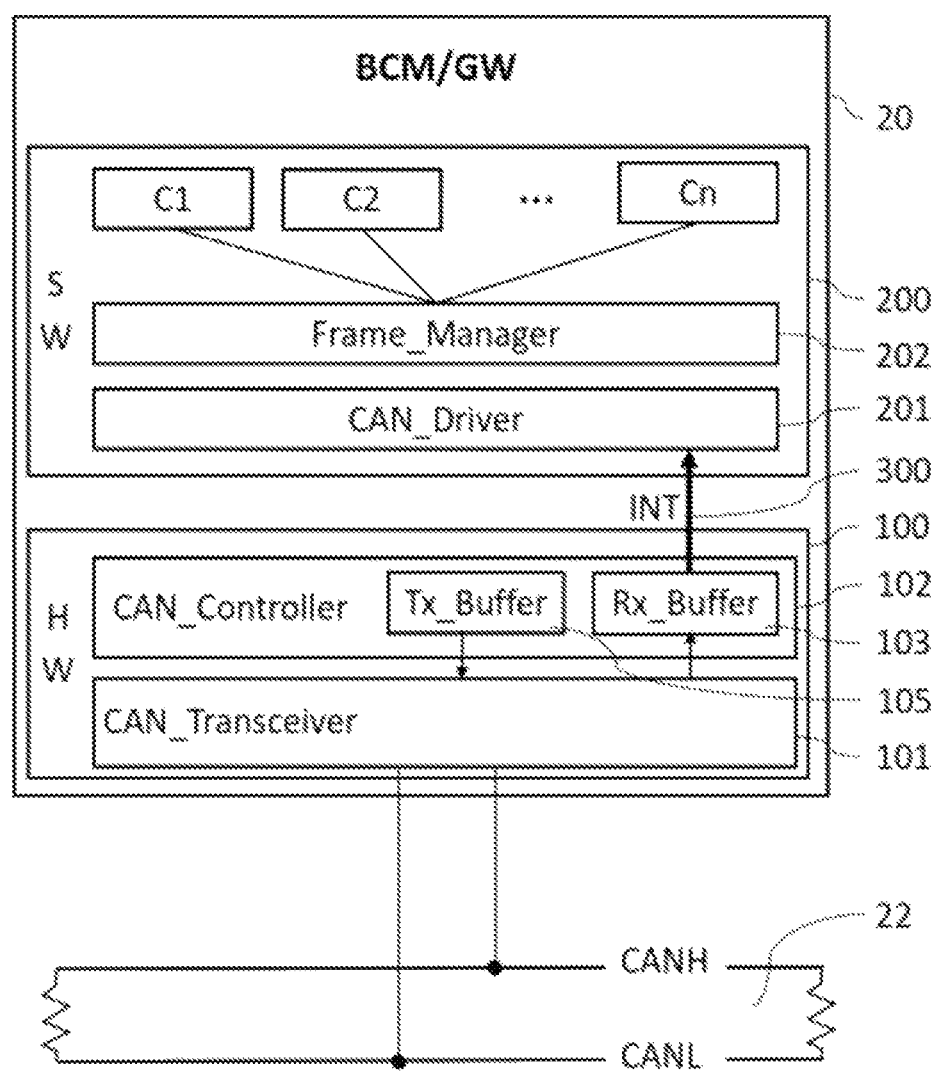
[Fig. 2]

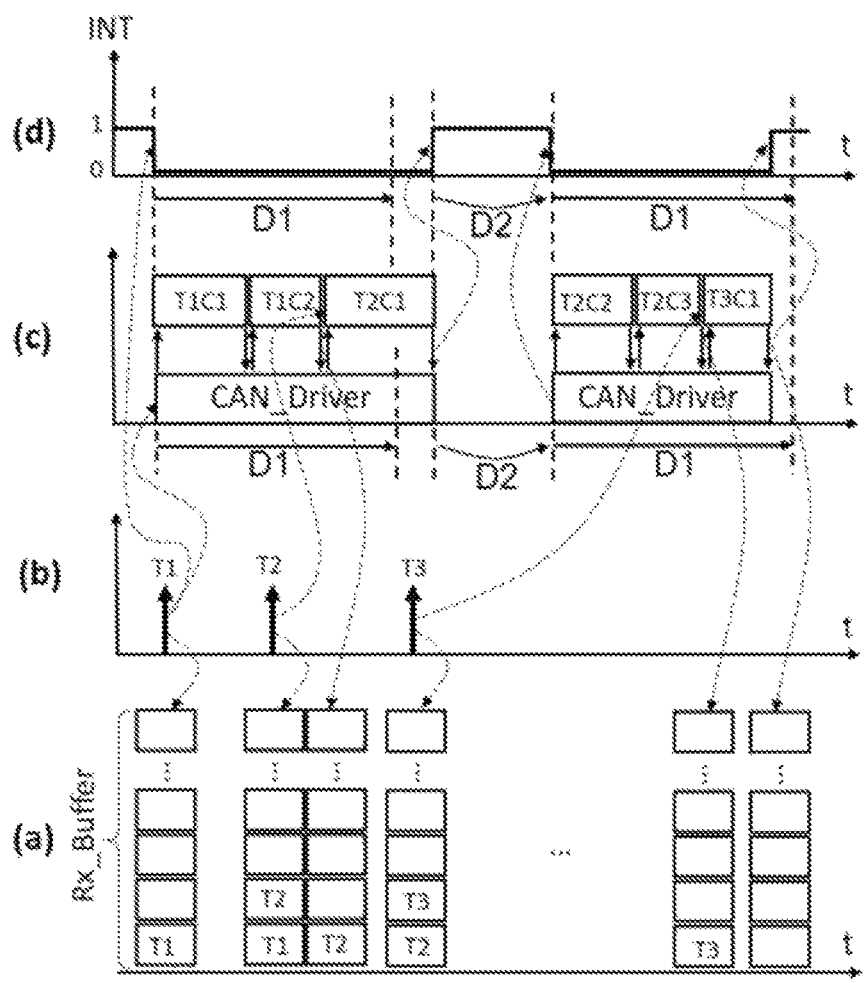

[Fig. 4]
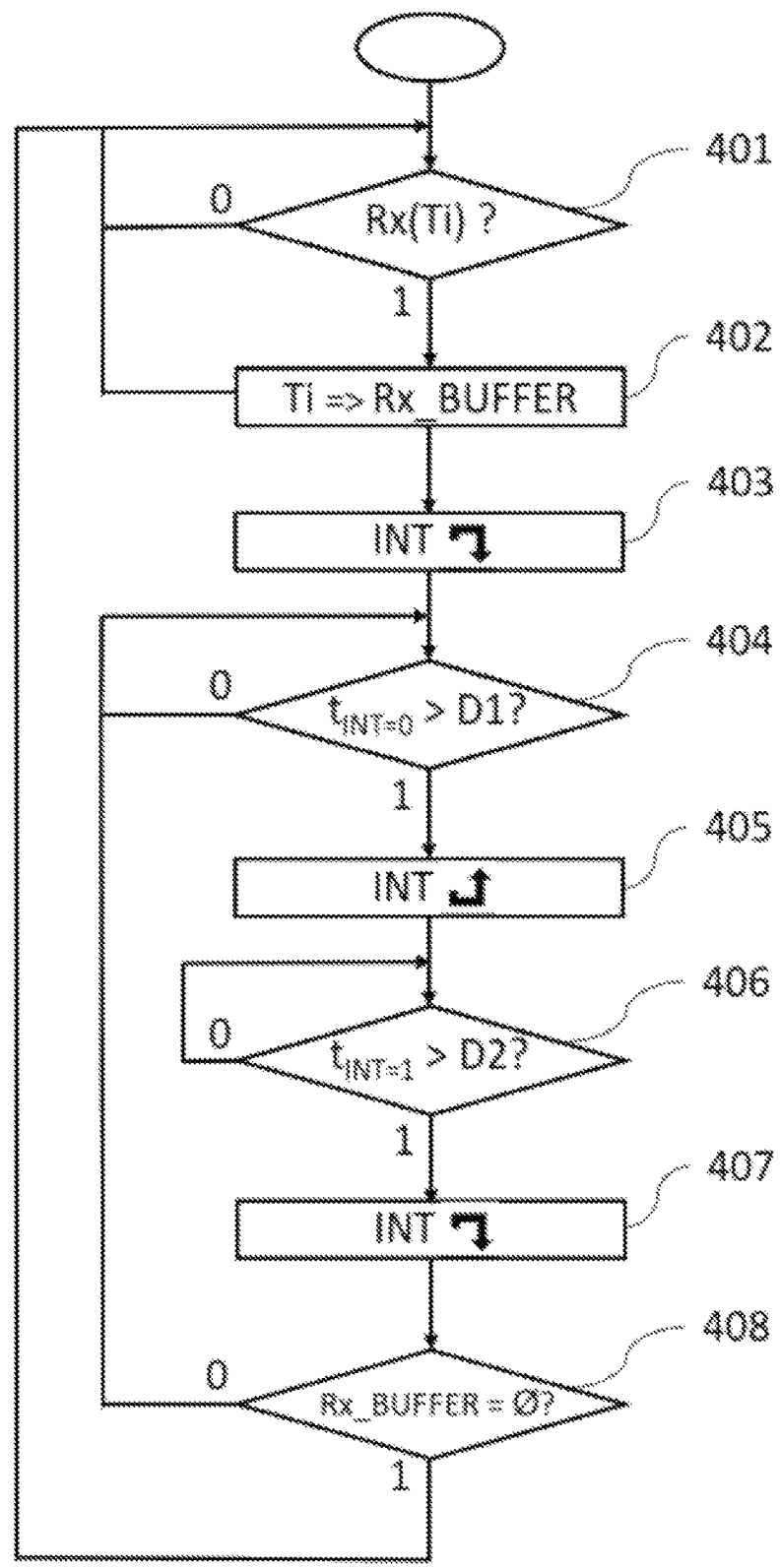

JOINT MANAGEMENT BY AN ONBOARD COMPUTER OF A MOTOR VEHICLE OF AN OPERATIONAL FUNCTION AND A GATEWAY FUNCTION BETWEEN DATA COMMUNICATION BUSES

CROSS REFERENCE TO RELATED APPLICATIONS

This application is the U.S. National Phase Application of PCT International Application No. PCT/EP2019/083785, filed Dec. 5, 2019, which claims priority to French Patent Application No. 1872445, filed Dec. 6, 2018, the contents of such applications being incorporated by reference herein.

FIELD OF THE INVENTION

The present invention relates generally to communication between onboard systems in motor vehicles, and more particularly to a computer which combines a dedicated operational function and a gateway function between onboard communication networks.

The invention is applicable, in particular, in onboard computers managing a main operational domain which is served by an associated data communication network, and implementing a gateway function for interconnecting the computer with other computers, for example computers respectively associated with subnetworks of the operational domain in question, and/or with a central gateway unit which interfaces the data communication network with other data communication networks respectively associated with other main operational domains.

BACKGROUND OF THE INVENTION

The data communications buses in question may be of the same type while being electrically isolated from each other, or may be of different respective types. In the latter case, the gateway function implemented by the computer may comprise protocol conversion between the respective communication protocols of each of the buses in question.

With the proliferation of sensors and the emergence of ever more safety and comfort functions, the volume of data communicated in a motor vehicle has increased continuously over the last few years. The trend is for this increase in data communication to continue, in particular because of the arrival of multimedia applications on board motor vehicles, in particular for what is called infotainment.

The use of multiplexed data communication networks (also called multiplexed data bus systems) which appeared shortly after the CAN bus (acronym for "Controller Area Network") was first presented by BOSCH GmbH in 1985, has made it possible to address this increase in the volume of data communicated. The emergence of changes to the CAN bus have brought about complex network structures in which a plurality of communication networks or subnetworks coexist in the vehicle, with respective specifications which may be different. Thus, applications are seen in which a conventional CAN bus may cooperate with a flexible-datarate CAN, or CAN FD, bus, which is defined as an option of the ISO standard 11898-2 of the conventional 125 kbits/s CAN bus which has been integrated into the ISO 11898-2: 2015 version of the standard. In addition, certain architectures integrate one or more high-speed CAN, or HS CAN, buses in compliance with the ISO standard 11898-2 (2003) which offer a datarate of up to 1 Mbits/s (depending on the length of the bus), and/or one or more low-speed CAN, or LS CAN, buses in compliance with the ISO standard 11898-3 (2006) which offer a datarate limited to 125 kbits/s but which is a fault-tolerant bus, or many other bus technologies such as the Local Interconnect Network, or LIN, bus standardized by the ISO under the name "Local Interconnect Network" under the category of "Road Vehicles" and under the reference ISO 17987, or more recently the FlexRay bus standardized by the ISO standard 17458, or the MOST (for "Media Oriented Systems Transport") bus which allows the optical transmission of data with a datarate of 21.2 Mbits/s and which is optimized for infotainment video and audio applications in the car.

The exchange of data between two networks or between a network and a subnetwork for data communication with respective technologies requires the implementation of a gateway function between the networks in question. Processors specifically dedicated to this gateway function are obviously available on the electronic components market.

However, the cost of such a component and of its operating environment prevents their widescale use in motor vehicles.

For that reason, in known embodiments, the vehicle comprises a few functional domains such as the powertrain, the chassis and the passenger compartment/body, with which respective communication networks are associated. These networks are interconnected by a central gateway unit, which is a computer specifically dedicated to this gateway function. In addition, the vehicle comprises one or more computers which, on the one hand, have a dedicated operational function and which, on the other hand, emulate a gateway function between one of the aforementioned networks and one or more among other onboard communication networks and/or subnetworks that are different from said networks. This makes it possible to save on computers dedicated to a gateway unit function, by using part of the resources and of the computing time of a computer which also provides an operational function.

Thus, certain computers combine the implementation of a given operational function with the emulation of a gateway function between data communications networks to which they are coupled by corresponding respective interfaces. The operational function may be, for example and without limitation, ignition, interior lighting, or heating/air conditioning. Its implementation consists in controlling a set of actuators, on the basis of information collected in particular by means of a set of sensors, using an onboard intelligence. The gateway function consists in processing frames received from a first communication bus according to the specifications of a first data communication protocol, and transmitting them over a second data communication bus after conversion into frames according to the specifications of another communication protocol associated with this second communication bus.

According to the current prior art, the computer comprises a frame manager which, on the computer receiving a sequence of frames to be converted and to be retransmitted as part of the gateway function, generates an interrupt which interrupts the current processing being performed by the CPU (central processing unit) as part of the operational function managed by the computer. The CPU then processes all of the received frames one after the other, over the same receive interrupt. In practice, the received frames are stored in an input buffer register, and are processed sequentially by the CPU according to their order of arrival, over the same interrupt, until the buffer is empty.

This solution of the prior art may involve overly lengthy monopolization of the CPU for the gateway function, leading to a deterioration in the real-time performance of the computer for its operational functions. This may be particularly problematic if an operational function whose real-time processing is thus affected is a safety function, such as, for example, correcting the trajectory of the vehicle to ensure its stability, emergency braking to avoid a collision, or the automatic unlocking of the doors in the event of a vehicle accident.

In other words, a drift in the real-time processing of the operational applications managed by the computer which is caused by the known implementation of the gateway function may have negative affect on guaranteeing critical times which must be observed for high operational priorities such as aspects related to the safety of the vehicle and of its occupants.

SUMMARY OF THE INVENTION

An aspect of the invention aims to eliminate, or at least mitigate, all or some of the aforementioned drawbacks of the prior art.

To that end, a first aspect of the invention provides a method for managing frames in an onboard computer of a motor vehicle of the type suitable for jointly ensuring at least one operational function and a gateway function between at least two data communication buses when it is coupled to a first data communication bus of the vehicle to receive and transmit data messages via the first bus, on the one hand, and is further coupled to a second data communication bus of the vehicle to receive and transmit data messages via said second bus, on the other hand, the computer being configured to implement a gateway function in order to transmit messages received from a transmitter via the first bus to a receiver which is accessible via the second bus.

The method comprises the following steps, implemented in the computer:

receiving one or more data messages from a transmitter via the first bus, said messages being intended for a receiver accessible via the second bus;

storing the received data messages in a buffer of the computer, awaiting their processing for transmission to the receiver via the second bus;

triggering a first interrupt to interrupt the execution of an operational program currently being executed by a processor of the computer and cause said processor to process the data messages stored in the buffer, for their transmission to the receiver via the second bus;

deactivating the interrupt in order to allow the processor to continue executing the functional program, after the expiration of a first determined duration and at the end of the processing of a message currently being processed by the processor at the time of said expiration, notwithstanding the potential presence of other messages in the buffer awaiting their processing by the processor for transmission to the receiver via the second bus; and, triggering a second interrupt at the end of a timeout of a second determined duration following the deactivation of the first interrupt, to again interrupt the execution of the operational program by the processor and cause said processor to continue processing messages stored in the buffer, for transmission to the receiver via the second bus.

By virtue of an aspect of the invention, the load on the computer corresponding to its gateway function is smoothed over time, i.e. it does not unacceptably adversely affect the processing of the other tasks of the computer related to the operational functions of the computer, and in particular the real-time processing of tasks which may have a significant real-time constraint.

In some embodiments, the load of the computer associated with its gateway function may represent up to approximately 30% of the load of the computer, i.e. of its computing time, such that only approximately 50% of its load represents tasks related to its specific operational functions (in an exemplary application where the total load of the computer is limited to approximately 80% on the basis of specifications to be observed), but without incurring any significant deterioration in the real-time performance of the applications in question.

Embodiments, taken individually or in combination, further provide for:

the first determined duration being a constant, fixed or programmable duration; or for the first determined duration being variable according to parameters taken into account by the computer;

the data messages being CAN frames, the first data communication bus being a CAN bus and the buffer being the receive buffer of the CAN cell of the computer which is associated with the first bus;

the first and the second communication bus being buses of different respective types from among the automotive communication bus types belonging to the following group: HS CAN/ISO 11898-2, CAN FD/ISO 11898-2: 2015, LS CAN/ISO 11898-3, FlexRay/ISO 17458, LIN/ISO 17987, MOST, J1939/SAE J1939, J2284/SAE J2284;

the value of the duration of the timeout being determined as a percentage of the tolerance applicable to the shifting of the tasks of an operating system of the computer.

A second aspect of the invention relates to a computer for a motor vehicle, of the type which is suitable for jointly ensuring at least one operational function and a gateway function between at least two data communication buses when it is coupled to a first data communication bus of the vehicle to receive and transmit data messages via said first communication bus, on the one hand, and is further coupled to a second data communication bus of the vehicle to receive and transmit data messages via said second communication bus, on the other hand. The computer is configured to implement a gateway function in order to transmit messages received from a transmitter via the first bus to a receiver which is accessible via the second bus. The computer comprises means for implementing all of the steps of a method according to the first aspect of the invention.

The computer may be the passenger compartment/body computer, for example. It may also be the engine control computer, or the chassis and safety computer, or any other computer on board the vehicle.

In a third aspect, another subject of the invention is a data communication architecture in a motor vehicle comprising at least a first data communication bus and a second data communication bus, and comprising a computer according to the second aspect above, which is coupled to the first bus to receive and transmit data messages via said first bus, on the one hand, and which is further coupled to the second bus to receive and transmit data messages via said second bus, on the other hand.

In a final aspect, the invention relates to a computer program product comprising one or more sequences of instructions stored on a machine-readable storage medium comprising a processor, said sequences of instructions being suitable for carrying out all of the steps of the method according to the first aspect of the invention when the program is read from the storage medium and executed by the processor.

DESCRIPTION OF THE DRAWINGS

Other innovative advantages and features of aspects of the invention will become apparent from reading the following completely non-limiting description, which is given by way of indication, with reference to the appended drawings, in which:

FIG. 1 is a block diagram of an exemplary data communication architecture in a motor vehicle;

FIG. 2 shows a block diagram of an exemplary onboard computer according to embodiments of the invention;

FIGS. 3A-3D illustrate an exemplary implementation of the method according to embodiments of the invention; and, FIG. 4 is a diagram of steps illustrating embodiments of the method according to the invention.

DETAILED DESCRIPTION OF THE PREFERRED EMBODIMENTS

In the following description of embodiments and in the figures of the appended drawings, identical elements or similar elements bear the same reference numerals in the drawings.

The diagram of FIG. 1 shows an exemplary data communication architecture in a motor vehicle to which embodiments of the invention may be applied. The architecture comprises for example a plurality of data communications networks such as the networks 11, 12 and 13, which are interconnected by a gateway unit 10. This gateway unit is a computer dedicated to this gateway function. Each of the networks 11, 12 and 13 serves a respective functional domain of the vehicle, which is driven by a main functional computer, respectively 20, 30 and 40.

In the example shown, the domain associated with the computer 20 is for example the "passenger compartment" or "body" domain, the domain associated with the computer 30 is for example the "powertrain" domain, and the domain associated with the computer 40 is for example what is called the "chassis and safety" domain. These computers may be microcontrollers from the RH850 family of microcontrollers sold by RENESAS™, which are dedicated to the automotive industry. Thus, for example: the computer 20 responsible for the passenger compartment/body domain (or BCM, for "body control module") may be a microcontroller of RH850/F1x type, for example an RH850/F1K microcontroller; the computer 30 responsible for the chassis (or CCM, for "chassis control module") and safety domain may be a microcontroller of RH850/P1x type; and the computer 40 dedicated to the powertrain domain (or PCM, for "powertrain control module") may be a microcontroller of RH850/E1x type.

Of course, these are only examples, and many other microcontrollers or microprocessor-based circuit boards may form the computers 20, 30 and 40, according to the particularities specific to each application. For example, the computers may be components from the MPC56x family dedicated to automotive applications, available from NXP™.

In one example, the data communication networks 11, 12 and 13 are for example multiplexed buses in compliance with the CAN protocol (ISO standard 11898), and more particularly networks of the CAN FD type presented in the introduction of the present description which is an extension of the classic CAN designed to improve the real-time performance of applications. The particularity of the CAN FD bus is to offer a bitrate which can be up to eight times higher than that of classic CAN, allowing up to 64 bytes of data to be transmitted per frame instead of eight for classic CAN.

Each network generally comprises a plurality of subnetworks, although this is by no means essential. For example, the network 13 associated with the powertrain domain may comprise a subnetwork 41 associated with engine control, and a subnetwork 42 associated with the transmission (namely the transmission of mechanical energy from the engine to the driving wheels of the vehicle). These two subnetworks comprise sensors and actuators which are driven, for each subnetwork, by a particular computer, in this case the engine control computer (or ECU, for "engine control unit") and the transmission computer (or TCU, for "transmission control unit"), respectively. Likewise, the network 12 associated with the chassis and safety domain may comprise a subnetwork 31 associated with braking control (managed by an ABS computer), and a subnetwork 22 associated with trajectory control (managed by an ESP computer), etc.

In what follows, a subnetwork of the network 11 will be described in detail more particularly, still with reference to the diagram of FIG. 1.

Specifically, the computer 20 responsible for the management of the passenger compartment/body domain is connected to one or more subnetworks, namely a subnetwork 21 and a subnetwork 22 in the example shown in FIG. 1. The first subnetwork 21 connects the computer 20 to computers which are respectively responsible, for example, for the locking/unlocking function of the doors of the vehicle, the management of the electric windows, the seat adjustment and heating controls, etc. The second subnetwork 22 connects the computer 20 to computers which are respectively responsible, for example, for the interior lighting of the vehicle, the exterior lighting and signaling of the vehicle, wiper controls, etc.

In the example shown, which is only illustrative and in no way limiting, the networks 21 and 22 are for example HS CAN buses, i.e. "high-speed" CAN data buses whose physical layer implements the specifications of the ISO standard 11898-2 as mentioned in the introduction. Their exchange datarate may reach 1 Mbits/s, being inversely proportional to the length of the bus.

In the example shown, the computer 220, which is responsible for the exterior lighting and signaling of the vehicle, is connected to actuators and to sensors by a subnetwork 50. The subnetwork 50 may, for example, be a LIN bus. The actuators may comprise, in particular, lamps 51 for the signaling lights, low-beam lights, high-beam lights, etc., geared motors such as the actuator 52 for adjusting the height of the headlights, for example, and any other member or accessory such as for example flasher units, voltage converters for discharge lamps, etc. The sensors may comprise body height sensors such as the sensor 53 for detecting the effect of loading of the vehicle, for example in order to correct the adjustment of the height of the headlights, a light sensor 54 for providing information allowing automatic activation of the sidelights and/or low-beam lights, etc.

It should be noted that certain members of the vehicle, actuators or sensors, may be shared by a plurality of networks, i.e. they may be required to receive or transmit information from or to a computer other than the computer which manages the network or subnetwork to which they are physically coupled. So for example, in the architecture shown in FIG. 1, the body height sensor 53 used by the computer 220 to manage the external lighting and signaling functions may communicate with the ESP computer managing the subnetwork 32 of the network 12 associated with the chassis and safety domain.

In order to allow this communication of data, which may be unidirectional or bidirectional, certain computers implement a gateway function, in addition to providing the operational functions for which they are primarily intended. This multiplicity of functions provided by a single computer aims and makes it possible to avoid the widescale use of gateway units between the different networks and subnetworks of the vehicle which have to exchange data. These gateway units are dedicated components, the main drawback of which is that they increase the cost of the onboard architecture of the vehicle.

With reference to the diagram of the FIG. 2, the hardware means 100 and the software means 200 of the computer 20 of FIG. 1 which take part in the implementation of the method according to embodiments of the invention will now be functionally described.

The hardware means 100 first of all comprise a transceiver module 101 for CAN, more particularly for HS CAN in the example considered here. This module provides the interface, at the physical level, for the transmission and reception of data in differential mode over the high and low lines, respectively denoted by CANH and CANL, of the CAN bus which constitutes the network 22 of FIG. 1. Specifically, as those skilled in the art are well aware, the CAN bus is, in the automotive field, a half-duplex bidirectional serial data bus with differential lines which are capped at each end of the bus by an impedance of 120 ohms.

The hardware means 100 also comprise a CAN controller 102. The function of the controller 102 is to provide a hardware interface between the transceiver 101 and the processing means of the computer 20. To that end, the controller 102 comprises in particular a receive buffer 103 and a transmit buffer 105. These buffers 103 and 105 have the function of storing the CAN frames received by the computer 20 via the bus 22 which are awaiting their processing by the computer or the CAN frames produced by the computer 20 which are awaiting their transmission over the bus 22, respectively.

Of course, those skilled in the art will appreciate that although the block diagram of the FIG. 2 shows only one interface with an external data communication bus, the computer comprises at least one other interface for exchanging data with another bus. In the case of the computer 20 shown in FIG. 1, thus, the computer 20 further comprises another interface with the CAN FD bus of the data communication network 11. This interface is not shown in the FIG. 2 so as not to overload this figure unnecessarily. The gateway function of the computer 20 consists in forming the link between the networks 11 and 22, in particular, which are of different types, but also between the networks 11 and 21, and likewise also between the networks 21 and 22 which are of the same type in the example considered here. Thus, in this gateway function, the computer 20 performs the routing of the frames from one network to another. It may also perform protocol conversion between the networks 21 and 22 which are of different respective types. Regardless of the respective type of data communication bus in question, the computer 20 may also perform more advanced processing on the frames that it transmits, for example for quality of service, encryption/decryption for the security of certain data exchanges, etc.

The software means 200 comprise a frame driver 201 (or CAN driver), a frame manager 202, and a plurality of N software components C1, C2, ..., Cn, where N is an integer. All of the software modules are run on a processor of the computer 20. To implement the gateway function of the computer, there are, among the components C1-Cn, one or more components responsible for decapsulating/encapsulating the data as part of the protocol conversion mentioned above (when the computer provides such conversion), others which may be responsible for processing related to security as mentioned in the paragraph above, etc. Each frame comprises eight bytes of data (for a standard HS CAN bus) or eight to 64 bytes of data in multiples of eight (for a CAN FD bus).

All of these processing operations take time. The specifications with which suppliers of onboard systems in automotive applications have to comply currently require being able to pass a complete message from one bus to another in 250 µs or even less, to 200 µs (which means 4000 to 5000 messages per second). When these messages are CAN frames, they are received in rapid succession at a rate of approximately one frame every 100 µs or every 150 µs. The computer may therefore receive CAN frames at a rate higher than that at which it is capable of processing them. That is why CAN frames arriving in rapid succession from the bus 22 are temporarily stored in the receive buffer 103, awaiting their processing by the computer 20.

However, when a CAN frame is received by the computer 20 with a destination address which implies that it has to be relayed to another network or subnetwork of a different type (therefore using the gateway function of the computer 20), the frame is stored in the receive buffer 103 of the CAN controller 102, and the latter generates a hardware interrupt INT, which bears the reference 300 in FIG. 2. This hardware interrupt may for example be performed by changing a bit which is normally at 1 to 0, where 0 and 1 refer to the binary logic values with which respective voltage levels are associated. The function of this interrupt is to suspend the current execution of the tasks associated with the operational functions of the computer, in order for the gateway function to take over the computer in order to convert and transmit the received frames.

In principle, i.e. without implementing an aspect of the invention, the interrupt INT is not lifted until the processing of all of the frames which are stored in the buffer 103 has ended. However, since this may take a significant amount of time and in order to prevent this from affecting the real-time performance of the computer, embodiments of the invention provide for arrangements which make it possible to pass the baton back to the operational applications, in order for their execution to resume and thus avoid these applications from being held up to the detriment of their quality of service.

Implementations of the mechanism proposed by an aspect of the invention will now be described with reference to the timing diagrams of FIGS. 3A-3D and the diagram of steps of FIG. 4. In what follows, reference will be made to these two figures alternately without necessarily specifying it in a particular way each time. The effect of the steps of the method illustrated by the diagram of FIG. 4 may be seen in the timing diagrams of FIGS. 3A-3D.

The timing diagram of the FIG. 3A illustrates the change in the content of the receive buffer 102 of FIG. 2 over time t (from left to right). In the example considered for this illustration, the data structure corresponding to this memory is a stack which fills up from the top and empties from the bottom on a "first in, first out," basis, with the frames received by the computer which enter and are stored in the memory until they exit therefrom in order to be passed to the frame driver for processing by the computer processor. More particularly, the registers of this data stack are represented by rectangles arranged one on top of the other.

The timing diagram of FIG. 3B shows the reception of frames T1, T2, T3, etc. at given respective times along the time axis t.

The timing diagram of FIG. 3C shows the activity of the frame driver 201 of FIG. 2 over time t. In this figure, the periods of activity of the frame driver are represented by rectangles. The frames concerned by this activity are also represented by rectangles in the timing diagram, above the aforementioned rectangle, and with an indication of the type "TiCj" where Ti denotes a frame of index i in the sequence of frames stored in the receive buffer, and where Cj denotes the software component of index j in the set of N software components C1 to Cn. Thus, for example, the indication T2C3 in a rectangle means that this rectangle denotes that the second frame T2 is processed by the third component C3.

Lastly, the timing diagram of FIG. 3D shows the activation and deactivation over time t of the interrupt INT of FIG. 2.

In the context of implementations of aspects of the invention considered here, an interrupt is an event, and more particularly a hardware event, for example the change of a bit stored in a register of the computer which is normally at 1, i.e. which is at 1 by default, to 0. In one example, the bit INT is considered to be initially at 1, which means that the interrupt has not been activated. The processor of the computer is free to execute the processes related to the operational applications of the computer.

The activation of the interrupt, i.e. the change of the bit INT from 1 to 0, has the function of causing the sequential execution of the process currently being executed in the host computer to stop, putting this process into a standby mode. During an interrupt, the processor saves all or part of its internal state, called "context", for example in the system stack. Next, it executes the interrupt routine associated with the interrupt in question, which here corresponds to the processing of the CAN frames received as part of the implementation of the gateway function of the computer. This routine, which is another program, namely a subroutine also called "interrupt service", is called for example by following the instructions of an interrupt table indicating, for each type of interrupt that the computer may receive, the subroutine to be executed.

The process corresponding to the operational program remains in this standby mode for as long as the interrupt is active, i.e. for as long as the bit in question remains at 0 in the example considered here. The execution of the program resumes where it left off once the interrupt is deactivated, i.e. when the bit is back at 1 in this example. To that end, the state of the processor is restored as it was saved at the moment when the interrupt occurred, and the execution of the operational program by the processor restarts from the place where it was interrupted.

Those skilled in the art will appreciate that the event indicated above for triggering the interrupt is only an example. Other hardware or software events may be substituted therefor without impairing aspects of the invention, depending in particular on the type of computer in question and/or the implementation of the frame manager. For example, the activation of an interrupt may be the writing of a given complex value in a given register.

Lastly, it should be noted that the curved dashed arrows show the logical implications between the various events shown or visible through the timing diagrams of FIGS. 3A-3D.

The procedure of the method according to implementations of an aspect of the invention, and more particularly steps 401 to 408 of the method which are illustrated in FIG. 4, will now be described. It is assumed that, initially, the receive buffer is empty and that the interrupt bit INT is at 1.

In 401, the computer receives one or more data frames from a transmitter via the bus 22 of FIGS. 1 and 2. These frames are intended for a receiver which is accessible via another bus, for example bus 11 of FIG. 1. The CAN controller detects this on the basis of the destination address contained in the CAN frames. That being the case, it causes the frames thus received to be stored, in 402, in the receive buffer, awaiting their processing with a view to their transmission to the receiver via said other bus. As may be seen in the first representation of the data structure of the receive buffer which is visible at the left end of the timing diagram of FIG. 3A, a first frame T1 is stored in the receive buffer.

Additionally, the reception of the first frame T1 of the sequence of frames received and stored in the receive buffer causes, in 403, the activation of the interrupt INT, i.e. the change of the corresponding bit from 1 to 0, in the example considered here, which is shown in FIG. 3D.

This triggering 403 of the interrupt INT has the effect of interrupting the execution of an operational program currently being executed by the processor of the computer. In addition, it also has the effect of causing said processor to process the received frames in order to transmit them to the receiver via the second bus. This processing is controlled by the frame driver which therefore becomes active at that time, as shown in the timing diagram of FIG. 3C. In the example shown, the frame driver, in conjunction with the frame manager, causes the frame T1 to be processed successively by the software component C1 and by the software component C2. The processing of a frame T2, which was received after the frame T1 and temporarily stored in the receive buffer, by the software component C1 is then started.

However, the expiration of a first determined duration D1 occurs in 404, during the above processing of the frame T2, this duration D1 being counted down from the triggering of the interrupt INT. Consequently, the interrupt INT is deactivated in 405 in order to pass the baton back to the processor to continue the execution of the functional program. This advantageously occurs only after and at the end of the processing of the frame T2 currently being processed by the software component C1 at the time of said expiration. Specifically, it is not desirable to interrupt the processing of a frame before it has been completed, in particular because this could leave registers of the computer with transient values which could lead to errors for the subsequent processing operations. It should be noted that the interrupt INT is lifted notwithstanding the potential presence of other received frames, in the buffer, awaiting their processing by the computer in order to transmit them to the receiver. Thus, in the example shown in FIGS. 3A-3D, a third frame T3 was received by the computer when the duration D1 ended, and it was stored in the receive buffer where it is still located, like the frame T2 whose processing must be continued by the software components C2 and C3 after the expiration of the duration D1 and more particularly when the processing of the frame T1 by the component C1 has ended. Regardless, the lifting of the INT interrupt passes the baton back to the processor of the computer in order to resume the execution of the one or more processes of the application program executed by the computer as part of its operational functions. Thus, by virtue of an aspect of the invention, the quality of service offered by these application programs, and in particular their real-time aspect, is not negatively affected by the predominance of the gateway function of the computer which results from the implementations according to the prior art.

In one implementation, the duration D1 is a constant duration. The value of the duration D1 may be determined on the basis of the tolerance applicable to the shifting (called "jitter") of the tasks of the onboard operating system. In one example, the duration D1 may be between approximately 50 microseconds and approximately 100 microseconds (ms). It may be fixed (i.e. immutable). As a variant, the duration D1 may be programmable.

In other implementations, the duration D1 may also be variable according to parameters taken into account by the computer, in order for example to adapt the real-time performance of the computer to particular circumstances. These parameters may be, for example, parameters measured by the computer.

The triggering 407 of a new interrupt occurs at the end 406 of a second timeout of determined duration D2 following the deactivation of the interrupt, i.e. at the end of the countdown of the duration D2 by a timeout circuit (timer), for example. This second interrupt, i.e. the next change of the bit INT from 1 to 0 visible in FIG. 3D, has the effect of again interrupting the execution of the operational program by the processor, and causing said processor to continue processing the frames received and stored in the buffer, in order to transmit them to the receiver via the second bus. Thus, the frames T2 may be processed by the software components C2 and C3, successively, and the frame T3 is processed by the software component C1, as shown in FIG. 3C.

In the example shown to FIGS. 3A-3D, the processing of all of the frames remaining in the receive buffer 102 of FIG. 2 is finished before the expiration of a new duration D1 following the new interrupt INT, such that the method stops at the end of the processing of the frame T3 by the software component C1. Otherwise, those skilled in the art will appreciate that the mechanism described above repeats, i.e. the interrupt INT is lifted in order to allow, in a new duration D2, the resumption of the processing of the operational program whose execution was interrupted, and a new timeout D2 is counted down before a new interrupt is generated in order to resume the processing of the frames which remain stored in the receive buffer 102 of the computer.

The value of the duration D2 of the timeout depends on the constraints specific to each application. In one embodiment, the value of the duration of the timeout D2 may be determined as a percentage of the tolerance applicable to the shifting of the tasks managed by the operating system of the computer. It may thus be between 5% and 15% of this tolerance. Typical values of D2 are of the order of a few microseconds (μs), or ten or tens of microseconds.

An aspect of the present invention has been described and illustrated in the present detailed description and in the figures of the attached drawings in possible embodiments. An aspect of the present invention is not limited to the embodiments presented, however. Other variants and embodiments may be deduced and implemented by a person skilled in the art after reading the present description and studying the appended drawings.

In particular, the architecture of the vehicle may be simpler or more complex than that illustrated by FIG. 1, in being divided into fewer functional domains, or conversely may comprise one or more other functional domains served by other respective main communication networks, such as for example an infotainment domain. Additionally, all or some of the main data communication networks may comply with a protocol other than CAN or one of its derived protocols, such as for example the FlexRay protocol already mentioned in the introduction.

Additionally, for the sake of simplicity, an onboard computer which is a single-processor computer has been envisaged in the present description, but the method may be generalized to multiprocessor computers, or computers with one or more processors with a plurality of processor cores, each capable of executing respective processes in parallel with one another.

Furthermore, the example of a gateway function between a first bus 22 which is a bus of HS CAN type and a second bus 11 which is a bus of CAN FD type has been used, but this is in no way limiting. Indeed, the first and the second communication bus are buses of different respective types which may be selected, in particular, from among the automotive communication bus types belonging to the following group:
HS CAN/ISO 11898-2,
CAN FD/ISO 11898-2: 2015,
LS CAN/ISO 11898-3,
FlexRay/ISO 17458,
LIN/ISO 17987,
MOST,
J1939/SAE 31939,
J2284/SAE J2284, etc.

In the claims, the term "comprise" or "include" does not exclude other elements or other steps. A single processor or several other units may be used to implement an aspect of the invention. The various features described and/or claimed may advantageously be combined. Their presence in the description or in different dependent claims does not exclude this possibility. The reference signs should not be understood as limiting the scope of the invention.

The invention claimed is:

1. A method for managing frames in an onboard computer of a motor vehicle of the type suitable for jointly ensuring at least one operational function and a gateway function between at least two communication buses when it is coupled to a first data communication bus of the vehicle to receive and transmit data messages via the first bus, on the one hand, and is further coupled to a second data communication bus of the vehicle to receive and transmit data messages via said second bus, on the other hand, the computer being configured to implement a gateway function in order to transmit messages received from a transmitter via the first bus to a receiver which is accessible via the second bus, the method comprising the following steps, implemented in the computer:
  a. receiving one or more data messages from a transmitter via the first bus, said messages being intended for a receiver accessible via the second bus;
  b. storing the received data messages in a buffer of the computer, awaiting their processing for transmission to the receiver via the second bus;
  c. triggering a first interrupt to interrupt the execution of an operational program currently being executed by a processor of the computer and cause said processor to process the data messages stored in the buffer, for their transmission to the receiver via the second bus;
  d. deactivating the interrupt in order to allow the processor to continue executing the functional program, after the expiration of a first determined duration and at the end of the processing of a message currently being processed by the processor at the time of said expiration, notwithstanding the potential presence of other messages in the buffer awaiting their processing by the processor for transmission to the receiver via the second bus; and, e. triggering a second interrupt at the end of a timeout of a second determined duration following the deactivation of the first interrupt, to again interrupt the execution of the operational program by the processor and cause said processor to continue processing messages stored in the buffer, for transmission to the receiver via the second bus.

2. The method as claimed in claim 1, wherein the first determined duration is constant.

3. The method as claimed in claim 2, wherein the first determined duration is programmable.

4. The method as claimed in claim 1, wherein the first determined duration is variable according to parameters taken into account by the computer.

5. The method as claimed in claim 1, wherein the data messages are CAN frames, the first data communication bus being a CAN bus and the buffer being the receive buffer of the CAN cell of the computer which is associated with the first bus.

6. The method as claimed in claim 1, wherein the first and the second communication bus are buses of different respective types from among the automotive communication bus types belonging to the following group: HS CAN/ISO 11898-2, CAN FD/ISO 11898-2: 2015, LS CAN/ISO 11898-3, FlexRay/ISO 17458, LIN/ISO 17987, MOST, J1939/SAE J1939, J2284/SAE J2284.

7. The method as claimed in claim 1, wherein the value of the duration of the timeout is determined as a percentage of the tolerance applicable to the shifting of the tasks of an operating system of the computer.

8. A computer for a motor vehicle, of the type which is suitable for jointly ensuring at least one operational function and a gateway function between at least two data communication buses when it is coupled to a first data communication bus of the vehicle to receive and transmit data messages via said first communication bus, on the one hand, and is further coupled to a second data communication bus of the vehicle to receive and transmit data messages via said second communication bus, on the other hand, the computer being configured to implement a gateway function in order to transmit messages received from a transmitter via the first bus to a receiver which is accessible via the second bus, the computer comprising means for implementing all of the steps of a method as claimed in claim 1.

9. A data communication architecture in a motor vehicle comprising at least a first data communication bus and a second data communication bus, and comprising a computer as claimed in claim 8 which is coupled to the first bus to receive and transmit data messages via said first bus, on the one hand, and which is further coupled to the second bus to receive and transmit data messages via said second bus, on the other hand.

10. A non-transitory computer program product comprising one or more sequences of instructions stored on a machine-readable storage medium comprising a processor, said sequences of instructions being suitable for carrying out all of the steps of the method as claimed in claim 1 when the program is read from the storage medium and executed by the processor.

* * * * *